(12) United States Patent
Clougherty

(10) Patent No.: US 11,305,493 B2
(45) Date of Patent: Apr. 19, 2022

(54) CONTAINER WITH PRODUCT VISUALIZATION APERTURE

(71) Applicant: Sonoco Development, Inc., Hartsville, SC (US)

(72) Inventor: Kenan James Clougherty, Hartsville, SC (US)

(73) Assignee: SONOCO DEVELOPMENT, INC., Hartsville, SC (US)

(*) Notice: Subject to any disclaimer, the term of this patent is extended or adjusted under 35 U.S.C. 154(b) by 0 days.

(21) Appl. No.: 16/909,206

(22) Filed: Jun. 23, 2020

(65) Prior Publication Data

US 2020/0316871 A1 Oct. 8, 2020

Related U.S. Application Data

(62) Division of application No. 15/698,226, filed on Sep. 7, 2017, now Pat. No. 10,744,720.

(51) Int. Cl.
*B29C 65/18* (2006.01)
*B29C 49/24* (2006.01)
(Continued)

(52) U.S. Cl.
CPC ............ *B29C 65/18* (2013.01); *B29C 49/24* (2013.01); *B29C 51/10* (2013.01); *B29C 51/16* (2013.01);
(Continued)

(58) Field of Classification Search
None
See application file for complete search history.

(56) References Cited

U.S. PATENT DOCUMENTS 1,894,295 A * 1/1933 Scandore ............... B31B 50/83
493/288
3,115,245 A 12/1963 Schechter
(Continued)

FOREIGN PATENT DOCUMENTS

EP 1057733 A1 12/2000
JP H0276729 A 3/1990
(Continued)

OTHER PUBLICATIONS

International Search Report and Written Opinion of the International Searching Authority for International Application No. PCT/US2018/047686 dated Nov. 27, 2018 [Provided in Parent Application].

(Continued)

*Primary Examiner* — Hemant Desai
*Assistant Examiner* — Tanzim Imam
(74) *Attorney, Agent, or Firm* — Nelson Mullins Riley & Scarborough LLP

(57) ABSTRACT

The present invention relates to a method for providing a product viewing window in a container. The container has at least a body ply and a liner ply, wherein the body ply has at least one aperture therethrough. The liner ply is adhered across the aperture, forming a window into the container. A window-finishing machine that comprises at least two platens and, optionally, a machine pocket positioned between them, a heating element extending through at least one of the platens, and a pressurized air device engages a container. The heating element heats the window of the container to the desired temperature, pressurized air is injected into the container such that the window is forced at least partially through the aperture of the container (and optionally into contact with the machine pocket wall), and the container window is then cooled to the desired temperature.

20 Claims, 10 Drawing Sheets

(51) Int. Cl.
  *B29C 51/10* (2006.01)
  *B29C 51/16* (2006.01)
  *B29C 65/00* (2006.01)
  *B29C 65/48* (2006.01)
  *B31B 50/82* (2017.01)
  *B31C 3/02* (2006.01)
  *B31F 7/00* (2006.01)
  *B65D 25/54* (2006.01)
  *B29L 31/00* (2006.01)
  *B29K 101/12* (2006.01)
  *B29K 105/00* (2006.01)
  *B29C 51/42* (2006.01)
  *B29C 49/64* (2006.01)

(52) U.S. Cl.
  CPC .......... *B29C 65/48* (2013.01); *B29C 66/5326* (2013.01); *B29C 66/7486* (2013.01); *B31B 50/82* (2017.08); *B31C 3/02* (2013.01); *B31F 7/002* (2013.01); *B65D 25/54* (2013.01); *B29C 49/6436* (2013.01); *B29C 51/422* (2013.01); *B29C 51/425* (2013.01); *B29C 2049/2404* (2013.01); *B29C 2049/2422* (2013.01); *B29K 2101/12* (2013.01); *B29K 2105/256* (2013.01); *B29K 2995/0026* (2013.01); *B29L 2031/712* (2013.01); *B29L 2031/717* (2013.01); *B29L 2031/778* (2013.01)

(56) References Cited

U.S. PATENT DOCUMENTS

| | | | |
|---|---|---|---|
| 3,217,923 A | 11/1965 | Price | |
| 3,290,856 A | 12/1966 | Rumberger | |
| 3,432,380 A * | 3/1969 | Weber | B65D 25/54 |
| | | | 428/159 |
| 3,555,769 A | 1/1971 | Sternau | |
| 4,227,615 A | 10/1980 | Flick | |
| 4,323,411 A * | 4/1982 | Uhlig | B29C 49/18 |
| | | | 156/244.14 |
| 4,361,227 A | 11/1982 | Paulucci | |
| 4,728,559 A | 3/1988 | Hardenbrook et al. | |
| 4,911,298 A | 3/1990 | Miyagawa et al. | |
| 5,012,972 A | 5/1991 | Nordstrom et al. | |
| 5,031,826 A | 7/1991 | Seufert | |
| 5,524,787 A | 6/1996 | Blake et al. | |
| 5,683,648 A | 11/1997 | Fortin | |
| 5,709,472 A | 1/1998 | Prusik et al. | |
| 5,860,550 A | 1/1999 | Miller et al. | |
| 5,968,616 A | 10/1999 | Kakemura | |
| 5,993,721 A | 11/1999 | Kurihara et al. | |
| 6,270,868 B1 * | 8/2001 | Matsui | B29C 49/20 |
| | | | 215/12.1 |
| 6,290,119 B1 | 9/2001 | Reese et al. | |
| 6,378,763 B1 * | 4/2002 | Nelson | B31C 3/00 |
| | | | 229/162.5 |
| 6,623,821 B1 | 9/2003 | Kendig | |
| 7,106,202 B2 | 9/2006 | Dickinson | |
| 8,569,411 B2 | 10/2013 | Tilton | |
| 2002/0088730 A1 | 7/2002 | Galomb | |
| 2004/0035874 A1 * | 2/2004 | Martin | B29C 66/112 |
| | | | 220/657 |
| 2004/0118904 A1 | 6/2004 | Versluys | |
| 2004/0159983 A1 * | 8/2004 | Clougherty | B29C 49/0078 |
| | | | 264/540 |
| 2006/0073294 A1 | 4/2006 | Hutchinson et al. | |
| 2007/0158352 A1 | 7/2007 | Cheng | |
| 2008/0115465 A1 | 5/2008 | Dickinson | |
| 2008/0211128 A1 | 9/2008 | Lucier et al. | |
| 2010/0052208 A1 * | 3/2010 | Jacobs | B65D 1/165 |
| | | | 264/241 |
| 2012/0061290 A1 | 3/2012 | Delaunay et al. | |
| 2012/0258305 A1 | 10/2012 | Haruta et al. | |
| 2013/0129874 A1 | 5/2013 | Fenske et al. | |
| 2014/0202462 A1 | 7/2014 | Stoks et al. | |
| 2016/0136864 A1 | 5/2016 | Miyawaki et al. | |
| 2019/0070790 A1 | 3/2019 | Clougherty | |

FOREIGN PATENT DOCUMENTS

| | | |
|---|---|---|
| WO | 2016083521 A1 | 6/2016 |
| WO | 2016131741 A1 | 8/2016 |

OTHER PUBLICATIONS

European Extended Search Report issued in EP Application 21195038.1 dated Nov. 19, 2021; 10 pages [Only new art cited herein, U.S. Pat. No. 5,968,646 and EP Patent 1057733 have been previously cited by the applicant via IDS on Jun. 23, 2020].

* cited by examiner

CONTAINER WITH PRODUCT VISUALIZATION APERTURE

CROSS-REFERENCE TO RELATED APPLICATIONS

This application is a continuation of U.S. patent application Ser. No. 15/698,226, filed Sep. 7, 2017 entitled "CONTAINER WITH PRODUCT VISUALIZATION APERTURE", which is incorporated herein in its entirety.

FIELD OF THE INVENTION

The present invention relates generally to containers with product visualization apertures, methods for making such containers, and devices utilized to make such containers.

SUMMARY OF THE INVENTION

According to an aspect, the present invention provides a method for providing a product viewing window in a container, the method comprising: providing at least one container having a body, a first end, and a second end opposite the first end, wherein the container body comprises at least a body ply and a liner ply, and wherein the body ply has an inner surface and an outer surface and defines at least one aperture therethrough; and wherein the liner ply is adhered to the inner surface of the body ply and has a portion extending across said aperture, forming a window into the container; providing a window-finishing machine that comprises: at least one first platen; at least one second platen; at least one machine pocket positioned between the at least one first and the at least one second platen, wherein the at least one machine pocket has an inside wall; a heating element extending through the at least one first or the at least one second platen; and a pressurized air device that is adapted to release pressurized air into the container through the at least one first or the at least one second platen; engaging the first end of the container with the first platen and engaging the second end of the container with the second platen, wherein the engagement of the container is airtight; positioning the container window adjacent the inside wall of the machine pocket; positioning the heating element such that it is adapted to heat the window of the container; heating the window of the container to the desired temperature; injecting pressurized air into the container such that the liner ply window is forced at least partially through the aperture of the container and into contact with the machine pocket wall; and allowing the container window to cool to the desired temperature.

According to another aspect, the present invention also provides a window-finishing machine adapted to receive a container having a body, a first end, and a second end opposite the first end, wherein the container body comprises at least a body ply and a liner ply, and wherein the body ply has an inner surface and an outer surface and defines at least one aperture therethrough; and wherein the liner ply is adhered to the inner surface of the body ply and has a portion extending across said aperture, forming a window into the container, wherein the machine comprises: at least one first platen; at least one second platen, wherein the at least one first and second platens are adapted to engage the first end of the container with the first platen and the second end of the container with the second platen, wherein the engagement of the container is airtight; at least one machine pocket positioned between the at least one first and the at least one second platen, wherein the at least one machine pocket has an inside wall adapted to receive the container window; a heating element extending through the at least one first or the at least one second platen, wherein the heating element is positioned to heat the window of the container; and a pressurized air device that is adapted to release pressurized air into the container through the at least one first or the at least one second platen.

According to yet another aspect, the present invention also provides a method for providing a product viewing window in a container, the method comprising: providing at least one container having a body, a first end, and a second end opposite the first end, wherein the container body comprises at least a body ply and a liner ply, and wherein the body ply has an inner surface and an outer surface and defines at least one aperture therethrough; and wherein the liner ply is adhered to the inner surface of the body ply and has a portion extending across said aperture, forming a window into the container; providing a window-finishing machine that comprises: at least one first platen; at least one second platen; a heating element extending through the at least one first or the at least one second platen; and a pressurized air device that is adapted to release pressurized air into the container through the at least one first or the at least one second platen; engaging the first end of the container with the first platen and engaging the second end of the container with the second platen, wherein the engagement of the container is airtight; positioning the heating element such that it is adapted to heat the window of the container; heating the window of the container to the desired temperature; injecting pressurized air into the container such that the liner ply window is forced at least partially through the aperture of the container; and allowing the container window to cool to the desired temperature.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
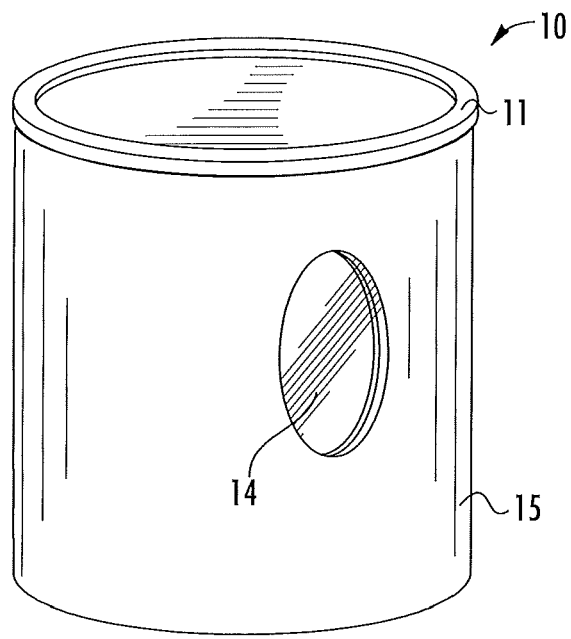
FIG. 1 is a front view of an embodiment of a container of the present invention.

Repeat use of reference characters in the present specification and drawings is intended to represent the same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

A variety of food, drink, and non-food products are packaged using tubular composite containers that are sealed at both ends. In many cases, the tubular composite containers have at least one structural body ply and are formed by wrapped a continuous strip of body ply material around a mandrel of a desired shape to create a tubular structure. The body ply material may be spirally wound around the mandrel or passed through a series of forming elements so as to be wrapped in a convolute shape around the mandrel. At the downstream end of the mandrel, the tube is typically cut into discrete lengths and is then fitted with end caps to form the container.

To assist consumers in making purchasing decisions, it is desirable to provide a tubular composite container for products constructed with one or more windows or apertures in the container wall to enable the consumer to view the product stored therein. An aperture or window into the container not only provides the consumer with the ability to compare the appearance of competing products, but also provides the consumer with confidence that the product does not have any defects, such as food spoilage in the case of food products, prior to making a purchase.

Cutting a product viewing window or aperture into a spirally wound or linearly drawn paper or composite container, particularly a window that is cut after the container is formed, has typically had a negative effect on the structural integrity of the container. In many of these containers, as the size of the aperture increases, the strength of the container decreases.

Additionally, the film window has typically been adhered flush with the inside wall of the container, impeding the viewability of the product itself as compared to a window that is flush with the outside wall of the container.

The present invention provides a multi-ply tubular container having a window for viewing the product contained therein. In an embodiment, the window is formed in a paperboard body ply and is covered by a transparent or translucent polymeric thermoformable liner ply on the inner surface thereof. In this manner, the product can be viewed through the window. The liner ply prevents liquids (such as juice, in the case of food products), and particulates from leaking out of the container and also prevents liquids and particulates from entering the container and possibly contaminating or damaging the product stored therein. In an embodiment, the liner ply is also resistant to the passage of gasses, so as to prevent any odors of the product in the container from escaping and to prevent atmospheric air from entering the container and spoiling or damaging the product contained therein. In an embodiment, the liner ply provides barrier properties to protect against the migration of moisture, water vapor, oxygen, solvents, or other compounds or gases into or out of the container.

In an embodiment, the container is constructed in a manner in which the structural integrity of the container is not compromised due to the window or aperture, or is only minimally compromised. In another embodiment, the window contributes to or improves the structural strength of the container. In a particular embodiment, the window is positioned flush with the outside of the container, or even extends beyond the outside surface of the container, providing improved viewability of the container contents.

In an embodiment, the container of the present invention may be used to store (i) food products that are packaged in a liquid, such as peas or corn; (ii) dry food products, such as powdered drink mixes, infant formula, or potato chips; or (iii) beverages. In another embodiment, the container of the present invention may be used to store various non-food products, such as nails, bolts, paperclips, or safety pins. In fact, the container of the present invention may be useful in storage of any consumer product that would benefit from viewability of the container contents. In an embodiment, the container is capable of being manufactured efficiently and inexpensively.

In an embodiment, the liner ply from which the window is formed can be a polymeric material having a low opacity that allows the product in the container to be easily viewed. For example, in an embodiment, the liner ply may comprise polyethylene, polypropylene, polyvinylchloride, or polyethylene terephthalate ("PET"). Any liner ply known in the art may be used herein. In one embodiment, the liner ply may be substantially or partially transparent or translucent. The liner ply may include a polymeric moisture barrier layer, such as a polyolefin polymer. In other embodiments, the moisture barrier layer may include at least one of the group of polyester, nylon, ethylene vinyl alcohol copolymer and blends thereof. In an embodiment, the liner ply has a thickness of less than about three mils. In another embodiment, the liner ply has a thickness of between about 0.5 mils and 20 mils.

In an embodiment, the container may be constructed of at least one body ply formed of a fibrous paperboard. The body ply may be wrapped into a tubular shape having an inner surface and an outer surface. The body ply may define at least one aperture therethrough such that when the body ply is wrapped or drawn into a tubular shape the aperture forms a window into the container. In an embodiment, the body ply defines multiple product viewing apertures therethrough. The liner ply may be adhered to the inner surface of the body ply such that a portion of the liner ply extends across the aperture in the body ply. In an embodiment, the liner ply is adhered to the inner surface of the body ply with a wet adhesive or a polymeric adhesive. The tubular container may optionally include a label ply adhered to the outer surface of the body ply. The label ply may define at least one aperture therethrough corresponding to the aperture in the body ply or may be transparent where the aperture in the body ply is located. The body ply and liner ply can be spirally wound, convolutely wound, helically wound, linearly drawn, or longitudinally, perpendicularly wound, and/or any combination thereof or using any other method known.

The present invention provides a method of manufacturing multi-ply tubular containers having a window for viewing the product contained therein. In an embodiment, the method includes advancing a continuous polymeric liner ply towards and wrapping the liner ply around a shaping mandrel to create a tubular shape. In this embodiment, a continuous body ply formed of paperboard is also advanced towards the mandrel. Apertures are cut in the body ply at predetermined intervals along its length before it reaches the mandrel. An adhesive may be applied to the inside surface of the body ply. The body ply then reaches the mandrel and is wrapped around the previously wrapped liner ply on the mandrel so that the liner ply becomes adhered to the body ply to create a tubular shape having one or more viewing windows. Once constructed, the tubular shape may be cut into discrete lengths. The parent tube may be cut into discrete lengths adjacent the end of the mandrel or in an entirely separate cutting station, optionally on a different mandrel. Optionally, at least one end of each discrete tube length can then be rolled outwardly to form a bead, or a flange for a metal end. In an embodiment, the liner ply is elastically deformable to prevent the bead from unrolling.

The parent tube or the cut container tubes may, in an embodiment, then be advanced to a window-finishing machine. The window-finishing machine may orient the tubes/containers vertically or horizontally. The window-finishing machine may, in an embodiment, comprise a rotary turret machine that supports one or more machine pockets spaced about the circumference of its main turret. Each pocket may be spaced and configured to hold, position, or nest with a composite container as described herein. In an embodiment, the machine pockets may be shaped half-cylindrically (or may form any portion of a cylindrical shape which matches the shape of the cut tubes). In an embodiment, the machine pockets are designed such that the containers described herein may nest with the machine pockets. More specifically, the window of the container may be nested against the wall of the machine pocket in an embodiment of the invention. The window-finishing machine may further comprise one or more upper and lower platens (also referred to herein as first and second platens) positioned above and below each pocket, configured to move toward and enclose each end of the container between them in an airtight manner, as the container simultaneously rests against or nests with the machine pocket wall. Each of the upper and lower platens may removably engage with an opposite end of the container.

The window-finishing machine may additionally include a cam which is located above, to the side, and/or beneath the turntable and is in the general form of a ring concentric with the turntable and extending above or beneath the circular path along which the containers are advanced, as the turntable is rotated about its axis. The cam may engage lifters attached to the upper and/or lower platens or may directly engage the upper and/or lower platens. As the turntable is rotated about its axis, the lifter and/or upper or lower platen for a given machine pocket may rise according to the cam profile, thereby lifting the container in order to engage with the other platen and finish the window in accordance with the invention. Thereafter, the lifter and/or upper or lower platen may lower according to the cam profile, thereby lowering the container in order to allow the container to be advanced to the next position.

In another embodiment, the window-finishing machine does not include machine pockets. In this embodiment, the window-finishing machine may orient the tubes/containers vertically or horizontally. The window-finishing machine may, in an embodiment, comprise a rotary turret machine that supports one or more upper and lower platens (also referred to herein as first and second platens), positioned and configured to move toward and engage each end of the container between them in an airtight manner. Each of the upper and lower platens may removably engage with an opposite end of the container.

In the position wherein the container is engaged with the upper and lower platens, a heating element may be present within the platen, may be inserted through the upper and/or lower platen, or may be positioned on the outside of the upper and/or lower platen, adjacent the container body. The heating element may be positioned near and/or directed toward the interior or exterior of the product visualization window. In an embodiment, this heating element allows the softening of the portion of the liner ply that is located within the window. Once the liner ply positioned within the aperture reaches the desired temperature, the container body may then be pressurized with air, forcing the liner ply positioned within the aperture to form into and/or through the aperture. A pressurized air device may be present within the platen or may be inserted through the upper and/or lower platen in an airtight manner. The pressurized air device may be positioned near and/or directed toward the interior of the product visualization window. In an embodiment, the softened liner ply is forced at least partially through the aperture, due to the increased air pressure. In a particular embodiment, the softened liner ply then comes into contact with the machine pocket wall. In another embodiment, the liner ply does not contact a machine pocket wall. In either case, the liner ply is then cooled. The container is then advanced out of the window-finishing machine.

With reference now to the drawings, a tubular container 10 according to the present invention is illustrated in FIG. 1. Although illustrated as a cylinder having a circular cross section, the tube may have any cross sectional shape that can be formed by wrapping or drawing the tube around an appropriately shaped mandrel. One example is a generally rectangular shaped tube having rounded corners. The embodiment illustrated in FIG. 1 may include various end closures, depending upon the type of product which is to be packaged.

Figure 2:
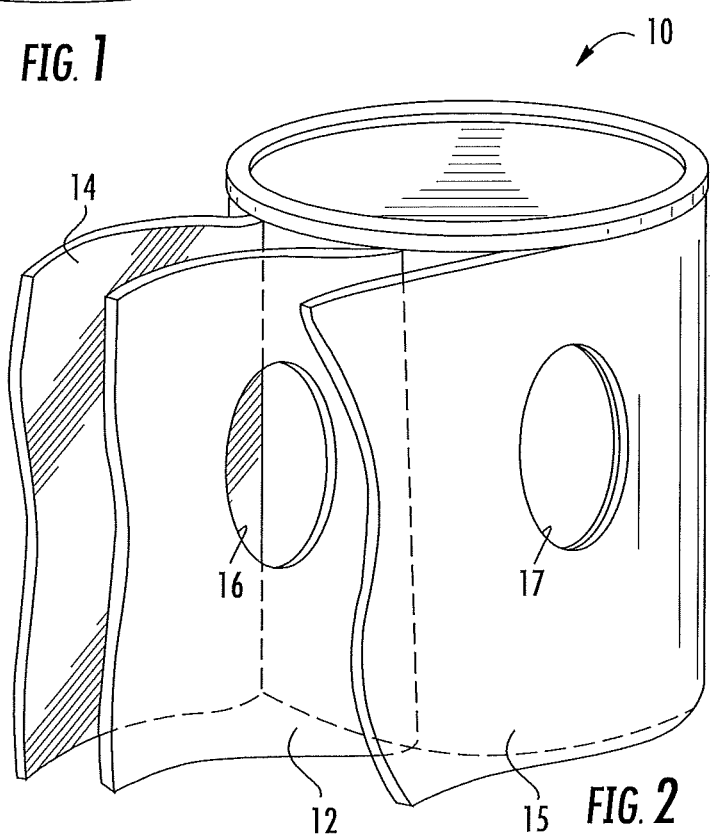
FIG. 2 is a front view of an embodiment of a container of the present invention.

As illustrated in more detail in FIG. 2, the tubular container 10 includes a body ply 12, which is preferably formed of paperboard, a liner ply 14, which is preferably formed of a thermoformable polymer film and is adhered to the inner surface of the body ply, and an optional label ply 15, which may have various indicia printed thereon regarding the product within the container. The label ply 15 may be adhered to the outer surface of the body ply. The upper end of the tubular container may be rolled over so as to form either a bead (not shown) or flange for metal end or closure. An end cap 11 may be snapped over the bead and may be reused. A metal, laminated, or any other type of closure known in the art (not shown) can be secured to the opposite end of the container or to both ends.

In an embodiment, the liner ply 14 is transparent, although translucent and slightly opaque liner materials which allow some visibility of the product packaged therein could be used. An optional additional barrier layer may be utilized, which may be resistant to the passage of liquids and gasses such as oxygen. If a barrier is required for both liquids and gasses, an exemplary barrier material that may be used is polyester. Alternative barrier materials may include nylon, EVOH (ethylene vinyl alcohol polymer and copolymer), polyvinylidene chloride, polyethylene, polypropylene, and silicon dioxide coated polymers and the like, as will be apparent to the skilled artisan. It will be understood that various barrier materials or properties could be employed depending upon the item being packaged. In various embodiments, the barrier materials could be incorporated into the liner ply 14 or provided as a separate material.

In an embodiment, the paperboard body ply 12 is made of a relatively thick and stiff paperboard. Any paperboard known in the art may be used in this invention. The body ply has at least one aperture 16 cut therethrough, as illustrated in FIGS. 1 and 2. In an embodiment, the label ply may have an aperture 17 cut therethrough corresponding to the aperture 16 cut in the body ply. In another embodiment, the label ply may be transparent in the areas corresponding to the aperture 16 cut in the body ply.

Figure 3:
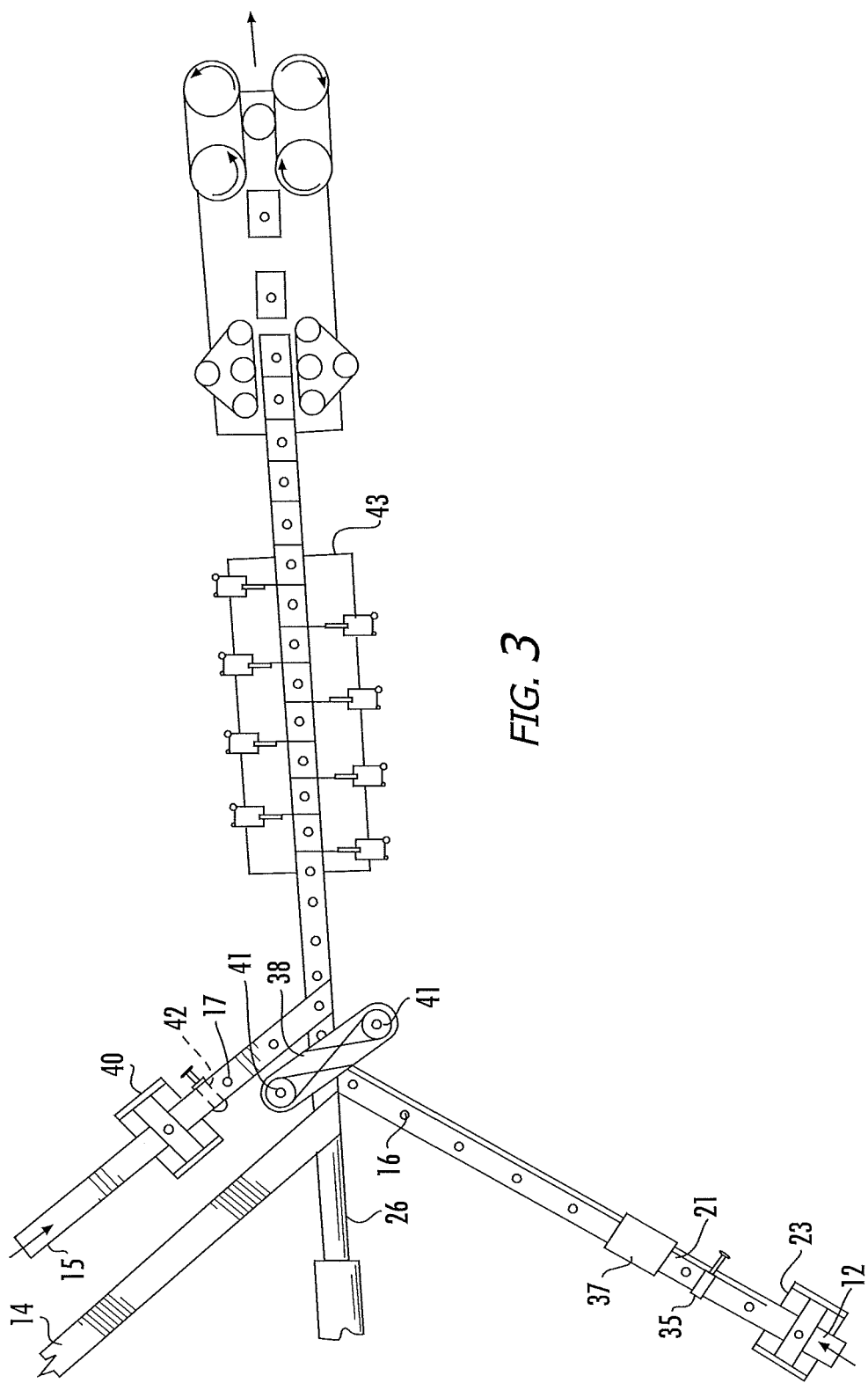
FIG. 3 is a top schematic view of an apparatus for constructing tubular containers with viewing windows according to an embodiment of the present invention.

An exemplary apparatus for constructing tubular containers with viewing windows according to an embodiment of the present invention is illustrated in FIG. 3. In an embodiment, a continuous strip of liner ply material 14 is fed from a reel (not shown) to the apparatus. The liner ply may then be helically wrapped about the mandrel 26.

After the liner ply 14 is wrapped about the mandrel 26, a body ply 12 may be wrapped around the liner ply 14 and adhesively secured thereto. A continuous strip of paperboard body ply material 12 is fed from a reel (not shown) to the apparatus. The body ply 12 may be advanced through a cutting die 23, which selectively cuts openings 16 through the body ply along the length of the body ply. In an embodiment, the cutting die 23 is a servo-controlled rotary die. In another embodiment, the cutting die 23 is a laser cutter. In another embodiment, the cutting die 23 is a water-jet cutter, a rotary die, a kiss-cutter die, or any other cutting device known in the art. In any event, openings 16 are cut into the body ply 12 prior to winding on the mandrel 26. Openings 16 may be any shape known in the art—square, circular, rectangular, triangular, diamond-shaped, or any other shape.

In an embodiment, the body ply 12 is then advanced through an adhesive applicator 35, which applies an adhesive 21 to the inner surface 81 of the body ply 12. The adhesive 21 may be an aqueous adhesive or a solvent-based adhesive. In an embodiment, the adhesive 21 will not interfere with the transparency of the liner ply 14. In an embodiment, the adhesive is applied to the inner surface of the body ply 12, rather than to the liner ply 14, which avoids application of adhesive to the window portion itself.

In an optional embodiment, the body ply 12 and adhesive 21 applied thereto may then be passed underneath a heater 37 that evaporates at least part of the water content of the aqueous adhesive 21 to render the adhesive substantially tacky. A particular type of heat source that may be used is an infrared heater although various other heat sources, e.g., forced air heating or the like can be used.

In an embodiment, the body ply 12 is then wrapped around the shaping mandrel 26 over the previously wrapped liner ply 14. In an embodiment, the body ply 12 is first wrapped under the mandrel then back over the top in a helical fashion. The inner surface of the body ply 12 comes into contact with the outer surface of the liner ply 14, which is exposed on the mandrel, and becomes adhered thereto. In an embodiment, multiple contiguous structural body plies can be used. The tube is then advanced down the mandrel 26 by a tube conveyor, such as a conventional winding belt 38, which extends around a pair of opposed pulleys 41.

In an embodiment, a label ply 15 may then be attached to the outer surface 82 of the body ply 12. As illustrated in FIG. 3, a continuous strip of pre-printed label ply 15 is fed from a reel (not shown) to the apparatus. The label ply 15 may be advanced through a cutting die 40, which selectively cuts openings 17 through the label ply 15 along the length of the label ply 15. Preferably, the label ply 15 is printed with an optically or magnetically readable eye mark or other locating device. As the label ply 15 approaches the die cutter 40, the locating device is registered by an encoder, which then provides a signal to the label rotary die 40 instructing the rotary die to make a cut. This allows the cut in the label ply 15 to be formed in a desired spatial relationship to the decorative print pattern such that, for example, the window in the container can be "framed" by the printed pattern on the label.

In an embodiment, the label ply 15 is then passed over an adhesive applicator 42. The label ply 15 is then wrapped around the body ply 12. In an embodiment, the label ply 15 could be applied to the body ply 12 before or after the winding belt 38.

In a separate embodiment, the container 10 could be formed as set forth above, but without cutting the windows 16, 17 into the body ply 12 and label ply 15 prior to wrapping on the mandrel 26. In this embodiment, the liner ply 14 is wrapped about the mandrel 26, the body ply 12 is wrapped about the liner ply 14 and adhered thereto, the label ply 15 is wrapped about the body ply 12 and adhered thereto, and then the composite container is passed through a cutting station. This could be a die cutting station, a laser cutting station, or any other cutting station known in the art. In this embodiment, one or more windows is cut through the optionally label ply 15 and the body ply 12, but does not cut through the liner ply 14. Accordingly, a window 16 is present in the container 10.

Figure 4:
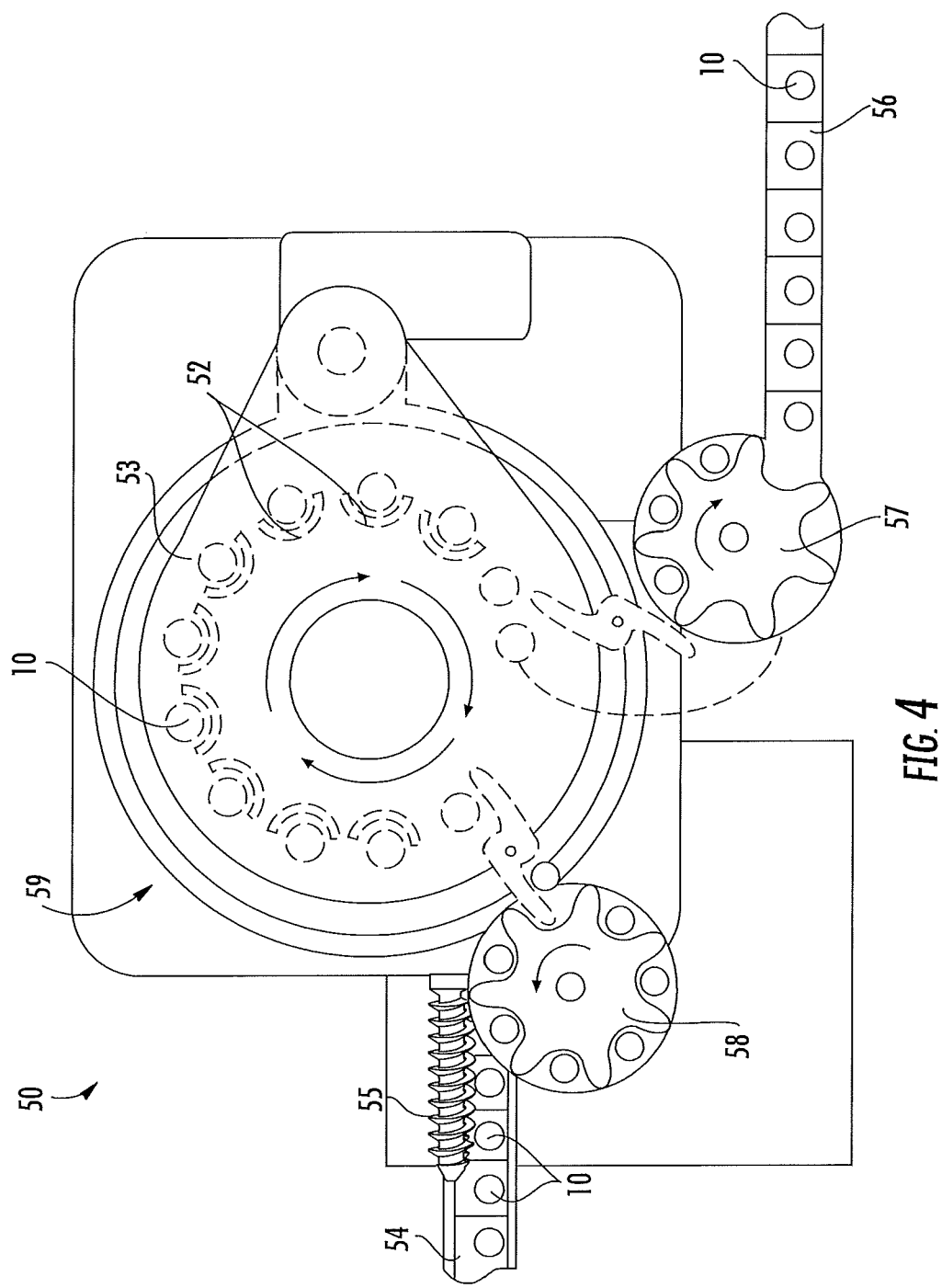
FIG. 4 is a top schematic view of an apparatus for constructing tubular containers with viewing windows according to an embodiment of the present invention.

In either embodiment, at a cutting station 43, the continuous tube may be cut into discrete lengths. As shown in FIG. 4, in an embodiment, the containers 10 are then oriented and advanced to a window-finishing machine 50. The containers 10 may be oriented vertically or horizontally, depending on the format of the window-finishing machine 50.

In another separate embodiment, the container 10 could be formed as set forth above, but without applying liner ply 14 to the interior of body ply 12. In this embodiment, the container may comprise body ply 12 containing window 16 and, optionally, label ply 15. In this embodiment, the liner ply 14 could be applied to the interior of the continuous tube or the discrete lengths of container tube in the form of a "patch." That is, the liner ply 14 patch could be configured and sized to be substantially similar in size, or larger than, the window 16. The patch could be applied to the interior of the body ply 12 by inserting it within the container shape and pressing it against the interior of the body ply 12 about the window 16. The patch could be sealed to the body ply 12 using a heat seal, a pressure sensitive seal, or any other sealing method known in the art.

Similarly, in yet another separate embodiment, the container 10 could be formed as set forth above but without cutting the windows 16, 17 into the body ply 12 and label ply 15 prior to wrapping on the mandrel 26. In this embodiment, the liner ply 14 is wrapped about the mandrel 26, the body ply 12 is wrapped about the liner ply 14 and adhered thereto, the label ply 15 is wrapped about the body ply 12 and adhered thereto, and then the composite container is passed through a cutting station. This could be a die cutting station, a laser cutting station, or any other cutting station known in the art. In this embodiment, one or more windows is cut through the optional label ply 15, the body ply 12, and the liner ply 14. A window 16 is then present in the container 10. In this embodiment, a patch could be configured and sized to be substantially similar in size, or larger than, the window 16. The patch could be applied to the interior of the container by inserting it within the container shape and pressing it against the interior of the liner ply 14 about the window 16. The patch could be sealed to the liner ply 14 using a heat seal, a pressure sensitive seal, or any other sealing method known in the art. The patch may be made from the same material as the liner ply 14.

Although a spiral wound container is described and shown in the Figures, it should be understood that any winding method known in the art could be utilized to form the container.

In an embodiment, the window-finishing machine 50 may comprise a multi-head/position continuous motion rotary machine that has upper and lower platens for airtight sealing of both ends of the container body. As shown in FIG. 4, the window-finishing machine 50 may comprise a rotating turntable 53 and a main rotary turret 59 that, in an embodiment, supports one or more machine pockets 52 spaced about its circumference, each spaced and configured to hold, position, or nest with a container 10. As each container 10 feeds into the main rotary turret 59, preferably with the container in an upright orientation, the rotary unit clamps both ends of the container 10 in an airtight manner. In an embodiment, either the top or the bottom clamping plate (or platens, described below) has a heating element 68 extending through the clamping plate. In an embodiment, the position of the heating element 68 is able to be adjusted vertically or horizontally by a cam function in the rotary unit turret 59.

In an embodiment, the window-finishing machine 50 may comprise an infeed conveyor 54 which advances the containers 10 into the window-finishing machine 50. In an embodiment, the window-finishing machine 50 may also comprise a feed screw 55 or any other suitable type of mechanism for conveying the containers 10 to the window-finishing machine 50. The window-finishing machine 50 may also comprise one or more infeed star wheels 58, designed to advance a container 10 from the infeed conveyor 54 to the main turret 59. Similarly, the window-finishing machine 50 may comprise one or more outfeed star wheels 57, designed to advance a container 10 from the main turret 59 to the outfeed conveyor 56. It should be understood that any configuration of the various elements of the window-finishing machine 50 may be utilized in connection with the present invention.

Figure 9:
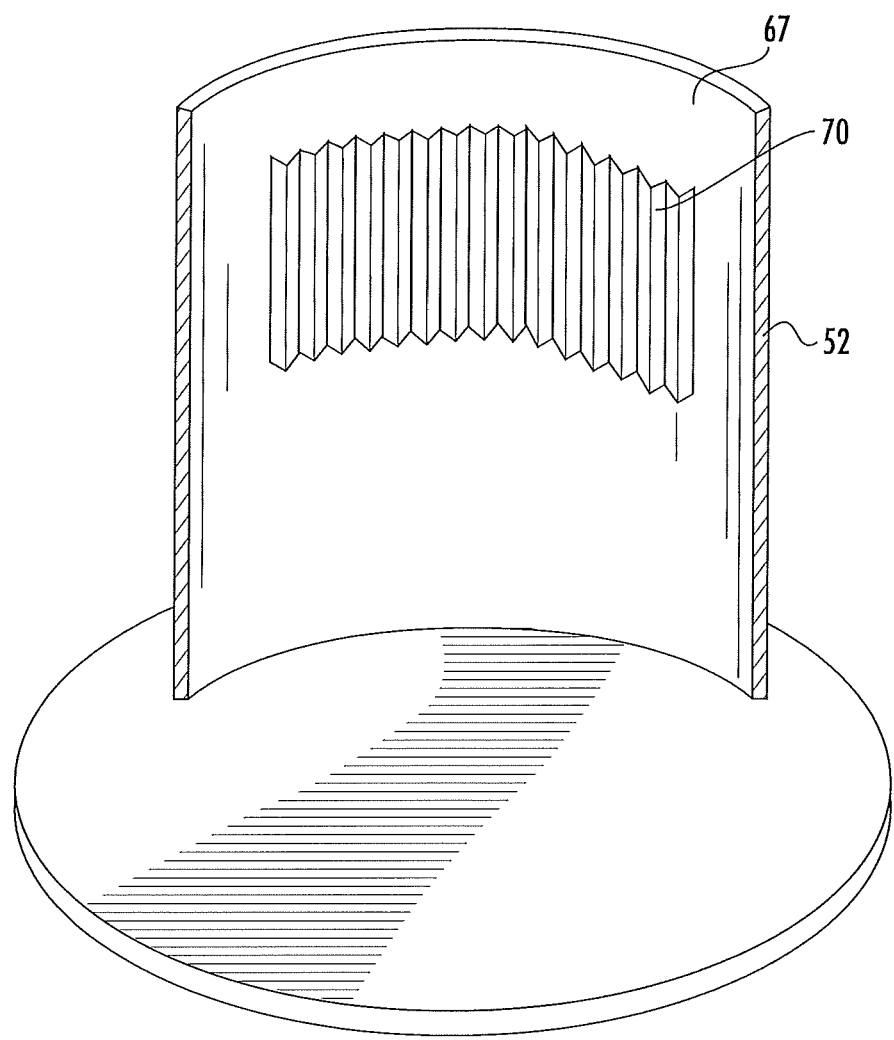
FIG. 9 is a perspective view of a machine pocket, part of the apparatus for constructing tubular containers with viewing windows according to an embodiment of the present invention.

In an embodiment, the machine pockets 52 may be substantially half-cylindrically shaped (shown in FIG. 9) such that the window 16 of the containers 10 may nest with the inside wall of the machine pockets 52. In other embodiments, the machine pockets 52 may be cylindrical or substantially cylindrical and may cover up to the full three hundred sixty degrees 360° of circumference of the container. This may allow the machine pockets 52, in an embodiment, to simultaneously address windows/apertures on opposite walls of the container as is further described herein. For example, a container 10 may have a window on the front and the back sidewall and the machine pocket 52 may substantially surround the container 10 in order to enclose the container 10. In still another embodiment, the machine pockets 52 may be less than half-cylindrically sized. In an embodiment, the shape of the machine pockets 52 may be any shape known in the art, but matches the shape of the containers 10.

Figure 5:
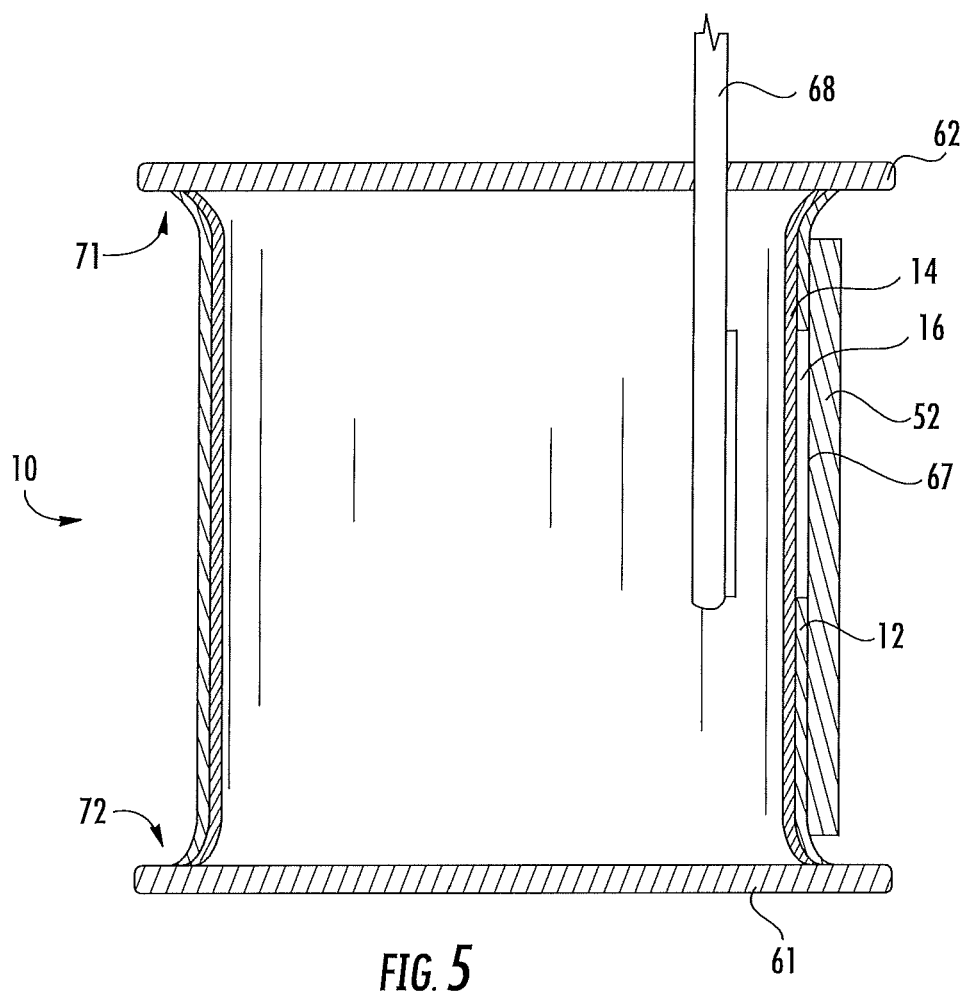
FIG. 5 is a cross-sectional view of a container and apparatus for constructing tubular containers with viewing windows according to an embodiment of the present invention.
Figure 6A:
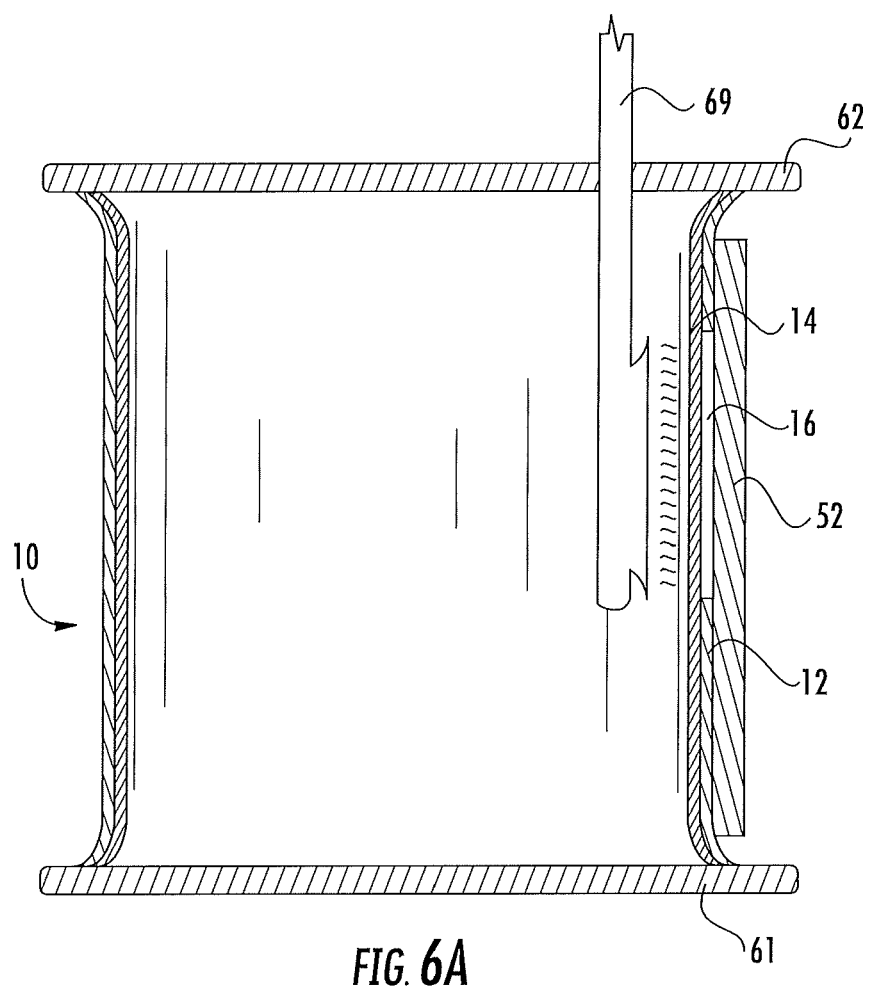
FIGS. 6A-B are cross-sectional views of a container and apparatus for constructing tubular containers with viewing windows according to an embodiment of the present invention.
Figure 6B:
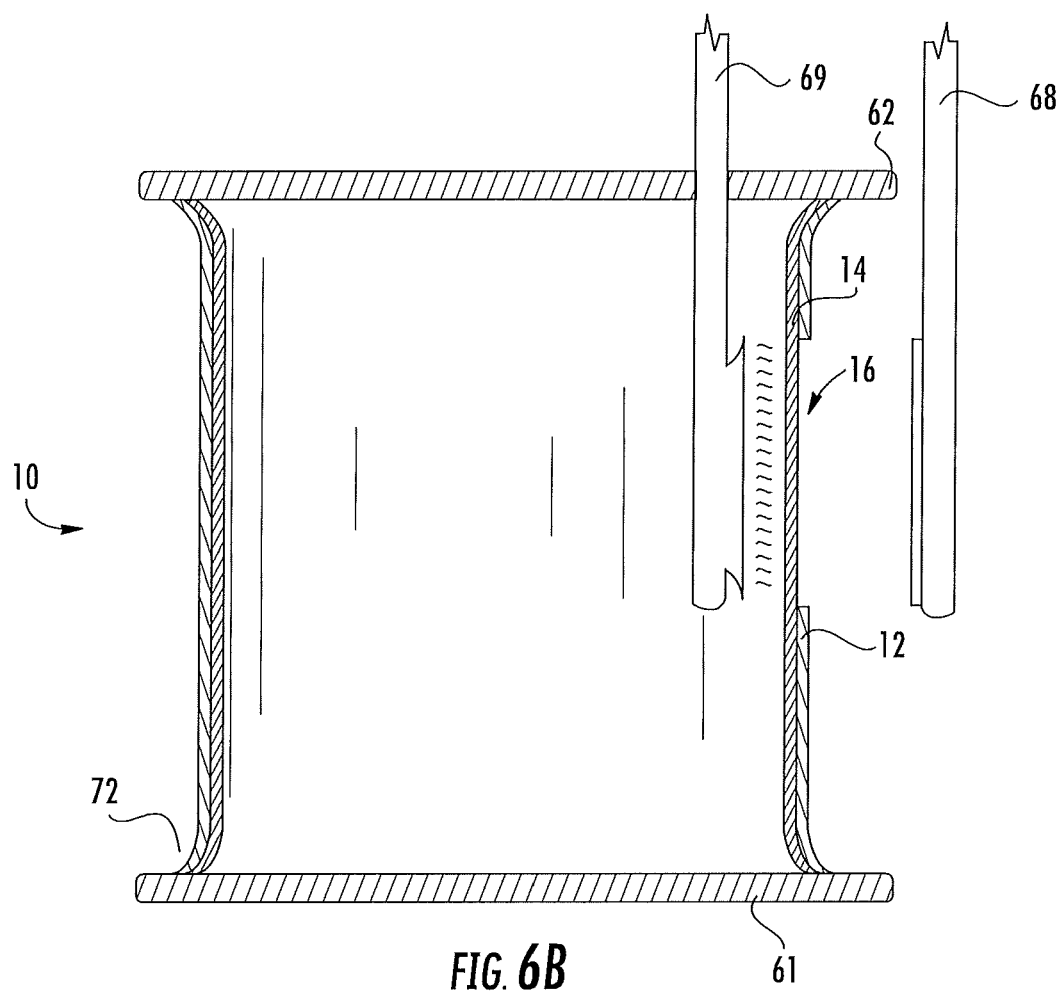

The window-finishing machine 50 may further comprise one or more upper 62 and lower 61 platens (shown in FIGS. 5-6), configured to move toward, clamp, and/or enclose the container 10 between them in an airtight manner, as the container simultaneously rests against or nests with the machine pocket 52 wall. Each of the upper 62 and lower 61 platens may removably engage with an opposite end of the container 10.

In the position wherein the container is engaged with the upper 62 and lower 61 platens, a heating element 68 (shown in FIG. 5) may be positioned within or inserted through the upper 62 and/or lower 61 platen. The heating element 68 may be positioned near or adjacent to or may be directed toward the interior of the product visualization window 16. The orientation of the heating element 68 should direct the heat toward the window 16. In an embodiment, the heating element 68 heats and softens the portion of the liner ply 14 located within the window 16. It may be desirable to heat the liner ply 14 to a temperature that is at or near the glass transition point or melting point of the particular polymeric material or film that is utilized as the liner ply 14. One of ordinary skill in the art will understand that this temperature will vary greatly depending on the material utilized for the liner ply 14.

In an embodiment, the heating element 68 comprises a resistance coil design, although other systems known in the art, such as Infrared, quartz, or halogen, could be utilized. In an embodiment, forced hot air is utilized in the invention to assist in moving the heat toward the container window 16. In an embodiment, the heating element 68 uses a shielding system to direct the heat toward the window 16 while limiting the heat effect on the remainder of the inner wall of the container. In an embodiment, the heating element is presented within the machine pocket, such that the machine pocket directs heat toward the window to soften it. In another embodiment, the heating element 68 is presented on the exterior of the container body and the window 16 is heated before the pocket is applied to the container body.

After the liner ply 14 positioned within the aperture 16 reaches the desired temperature, the container body 10 may then be pressurized with air. In an embodiment, a pressurized air device 69 (shown in FIG. 5) may be positioned within or inserted through the upper 62 and/or lower 61 platen in an airtight manner. The pressurized air device 69 may be positioned near or directed toward the interior of the product visualization window 16. In another embodiment, the pressurized air is introduced into the container body directly through one of the upper 62 and/or lower 61 platens. In either embodiment, the pressurized air is released within the sealed container, forcing the softened liner ply 14 that is positioned within the aperture 16 to be expanded into and/or through the aperture 16. The softened liner ply 14 is forced through the aperture 16 until it comes into contact with the inside wall of the machine pocket 67. The liner ply 14 is then cooled against the machine pocket wall 67.

Figure 7:
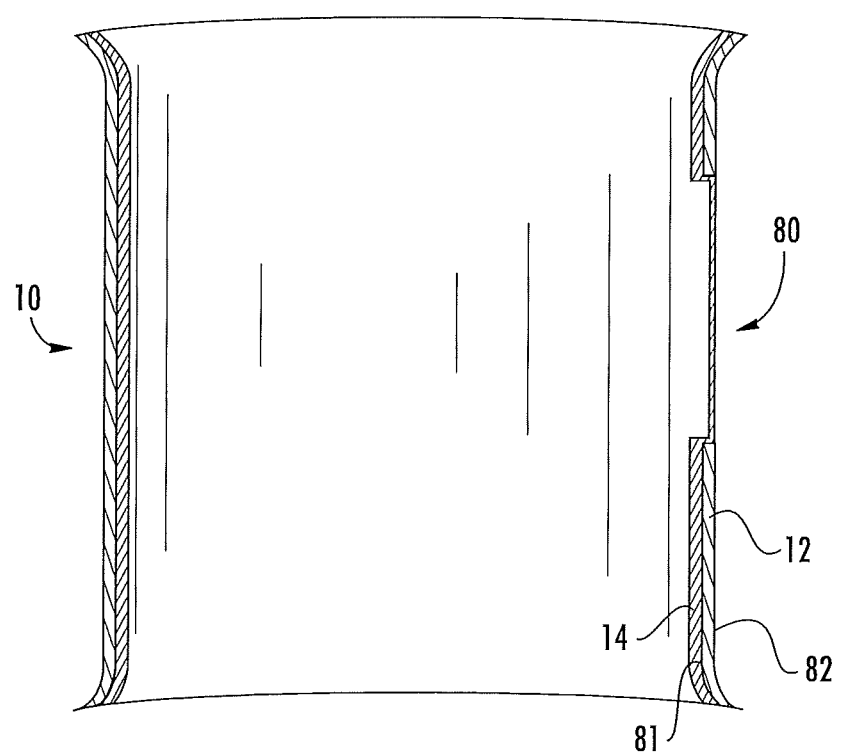
FIG. 7 is a cross-sectional view of a container according to an embodiment of the present invention.
Figure 8:
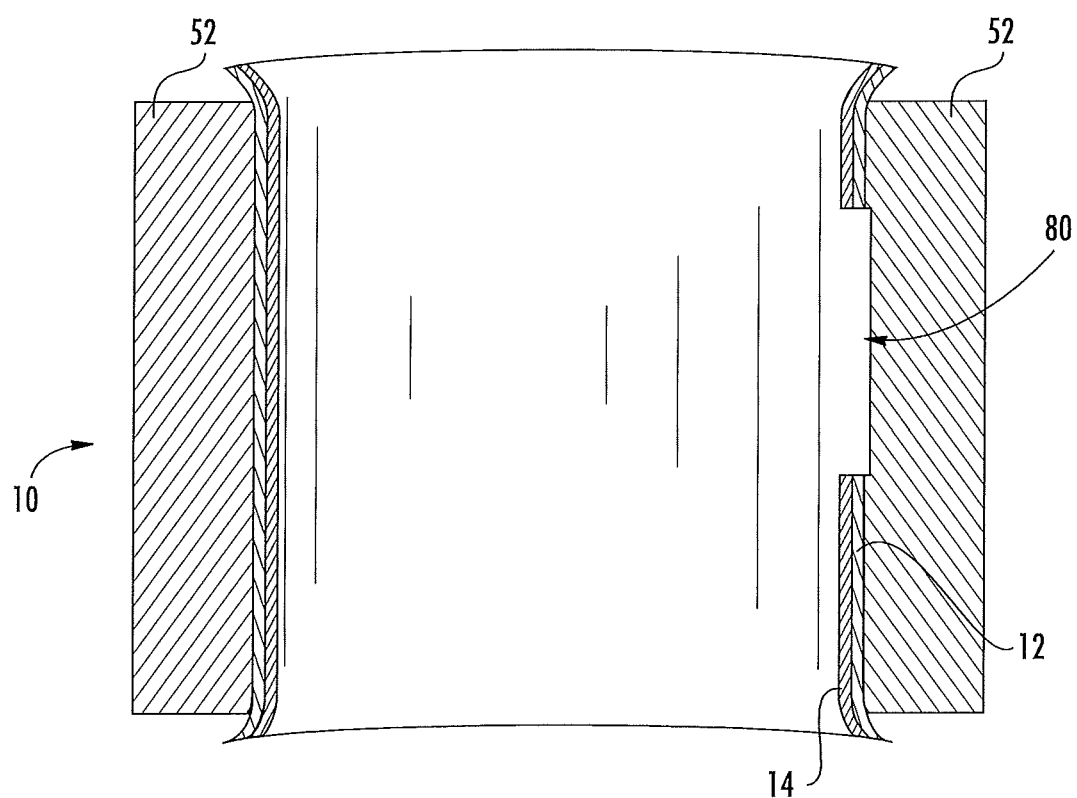
FIG. 8 is a cross-sectional view of a container according to an embodiment of the present invention.

In an embodiment, the machine pocket wall or the relevant insert (discussed below), if any, may be cooled by blown air or liquid (i.e. a water jacket) in order to more quickly cool the liner ply 14. In an embodiment, the formed polymeric window 80 (shown in FIGS. 7-8). will be cooled to a temperature at which the window 80 can survive the handling and conveying of the downstream production equipment. In an embodiment, the window 80 is cooled to a temperature that is at or below the glass transition or melting point of the polymeric material that is used. The cooled temperature should be sufficient to avoid any sag, deformation, or distortion in the window 80 once it is advanced out of the window-finishing machine 50.

In an embodiment, interior machine pocket wall 67 (shown in FIG. 9) may be smooth, textured (shown in FIG. 9 as a corrugated texture 70), contoured, or may have an imprinted logo or text. As the softened liner ply 14 contacts the machine pocket wall 67 and cools, it will mold to, or mirror, the surface texture of the machine pocket wall 67. The resulting container 10 will have a product visualization window 80 that is smooth, textured, contoured, embossed, or has an imprinted logo or text, each based upon the contouring of the inner surface of the machine pocket wall 67. For example, if the machine pocket wall has a corrugated textured surface 70, this corrugated texture may be permanently formed into the film in the product visualization window 80 as it cools. In an embodiment, the contour of the machine pocket wall 67 may be adjusted by placement of various inserts into a slot in the machine pocket wall 67. For example, a corrugated insert may be placed in the slot for a particular container and a smooth insert may be placed in the slot for a different container.

In an embodiment, the texture of the machine pocket wall 67 is designed to impart a structural benefit to the product visualization window 80. In this embodiment, the product visualization window 80 contributes to and/or improves the overall structural integrity of the container. For example, the machine pocket wall 67 could impart a corrugated, columned, v-shaped, arched, circular, or triangular structure to the product visualization window.

In an embodiment, the inventive method, device, and container provide a product visualization window 80 that is flush with the inside wall of the container 10. Pressurized air may or may not be utilized in this embodiment. In another embodiment, the product visualization window 80 may be flush with the outside wall of the container 10, potentially providing improved viewability of the container contents (shown in FIG. 7).

In another embodiment, the inventive method and container provide a product visualization window 80 that extends a particular distance past the outside wall of the container, controlled by the distance between the container 10 and the machine pocket wall 67. In this embodiment, the window finishing machine 50 may position the container 10 a suitable distance away from the machine pocket wall 67. When the liner ply 14 is heated and air pressurized, it is forced through the aperture 16 until it contacts the machine pocket wall 67. If the machine pocket wall 67 is positioned a controlled distance away from the container 10, the liner ply 14 will be forced beyond the surface of the container before it contacts the machine pocket wall 67. The liner ply 14 will then be cooled, creating a product visualization window 80 that extends a particular distance past the outside wall of the container 10 (shown in FIG. 8).

In an alternative embodiment, a product visualization window 80 that extends a particular distance past the outside wall of the container may be created by providing a machine pocket wall 67 that is recessed. Thus, the container 10 nests against the recessed machine pocket wall 67. When the liner ply 14 is heated and air pressurized, it is forced through the aperture 16 until it contacts the recessed machine pocket wall 67. The liner ply 14 will then be cooled, creating a product visualization window 80 that extends a particular distance past the outside wall of the container 10.

Further, if desired, the machine pocket wall 67 may be designed to produce a product visualization window 80 which is recessed within the container wall. In this embodiment, the machine pocket wall 67 may be designed such that it extends into the aperture 16. Before or after the liner ply 14 is heated, the machine pocket wall 67 may be contacted with the container, extending at least partially into the aperture 16. In this embodiment, pressurized air may or may not be utilized. The liner ply 14 will then be cooled, creating a product visualization window 80 that is recessed a particular distance inside the wall of the container 10. In an embodiment, multiple polymer liner structural elements may be present, which may improve the strength characteristics of the window and container. These multiple polymer liner structural elements may include corrugations, columns, arches, or any other feature which will support the body wall where the aperture was formed.

Figure 10A:
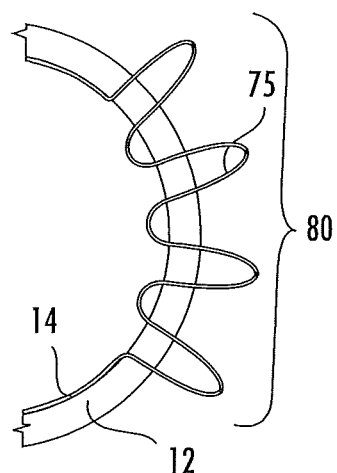
FIGS. 10A-D illustrate top cross-sectional views of embodiments of a container of the invention.
Figure 10B:
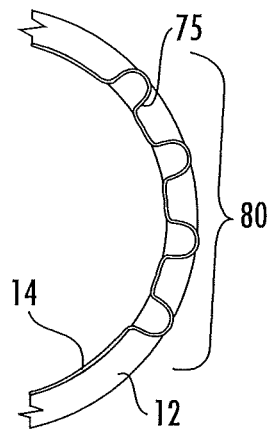
Figure 10C:
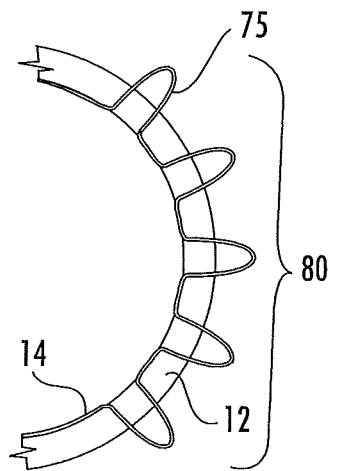
Figure 10D:
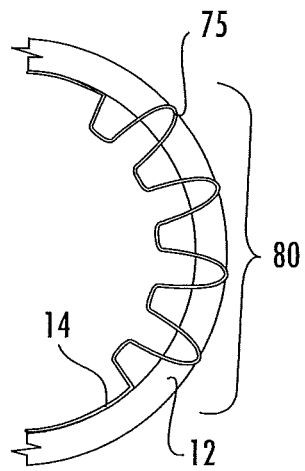

FIGS. 10A-10D illustrate a top cross-section view of the container of the invention. In these Figures, the product visualization window is illustrated having a corrugated texture. The corrugations 75 are shown extending various distances in various embodiments. For example, in FIG. 10A, the corrugations 75 are shown to extend inward of the body ply 12 and outward of the body ply 12. In FIG. 10B, the corrugations 75 are shown to be entirely contained within the width of the body ply 12, such that the corrugations are the same width as the interior and exterior wall of the body ply 12. In FIG. 10C, the corrugations 75 are shown to begin at the interior wall of the body ply 12, but extend beyond the exterior wall of the body ply 12. In FIG. 10D, the corrugations 75 are shown to extend inward of the interior wall of the body ply 12, but end at the exterior wall of the body ply 12. In an embodiment, the corrugations 75 extend at least the distance of the interior and exterior walls of the body ply 12, as shown in FIG. 10B.

In any embodiment, after the product visualization window 80 is cooled, the container 10 is then advanced out of the window-finishing machine 50. In an embodiment, a finish closure may then be applied to one or both ends of the container body with or without filling the container with a consumer product, each of which may be accomplished using standard methods in the art.

In a particular embodiment, the window 80 size can be increased without reducing the structural integrity of the container, using the inventive method. In still another embodiment, the inventive method and container can be utilized without sacrificing manufacturing speed and productivity.

As previously mentioned, the method of constructing containers 10 with windows for viewing the stored product from outside the container according to the present invention is not limited to one or two body plies, but may also be applicable to containers comprising three or more body plies.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged in whole or in part. Furthermore, those of ordinary skill in the art will appreciate that the foregoing description is by way of example only, and is not intended to limit the invention so further described in such appended claims. Therefore, the spirit and scope of the appended claims should not be limited to the description of the versions contained therein.

What is claimed is:

1. A window-finishing machine adapted to receive a container having a body, a first end, and a second end opposite the first end, wherein the body comprises at least a body ply and a film liner ply, wherein the body ply has an inner surface and an outer surface and defines at least one aperture therethrough, wherein the liner ply is adhered to the inner surface of the body ply and has a portion extending across said at least one aperture, forming a window of the container, and wherein the machine comprises:

a. at least one first platen;
b. at least one second platen, wherein the at least one first platen is adapted to engage the first end of the container and the at least one second platen is adapted to engage the second end of the container, wherein the engagement with the container is airtight;
c. at least one machine pocket positioned between the at least one first platen and the at least one second platen, wherein the at least one machine pocket has an inside wall adapted to receive the window;
d. a heating element extending through a through hole in the at least one first platen or the at least one second platen, wherein the heating element is positioned to heat the window of the container; and
e. a pressurized air device that is adapted to release pressurized air into the container through the at least one first platen or the at least one second platen.

2. The machine of claim 1, wherein the machine is a multi-position continuous motion rotary machine.

3. The machine of claim 1, further comprising a turret that supports the at least one machine pocket.

4. The machine of claim 1, wherein the at least one machine pocket is half-cylindrically shaped.

5. The machine of claim 1, wherein the heating element is removably inserted through the at least one first platen or the at least one second platen.

6. The machine of claim 1, wherein the inside wall of the at least one machine pocket is contoured.

7. The machine of claim 6, wherein the contour of the at least one machine pocket is selected from the group consisting of smooth, textured, imprinted, columned, v-shaped, triangular, and corrugated.

8. The machine of claim 1, wherein the heating element is configured to be adjustable vertically or horizontally within the container such that heat is directed toward the window.

9. The machine of claim 1, additionally comprising a means for cooling the inside wall of the at least one machine pocket.

10. The machine of claim 9, wherein the means for cooling comprises forced cold air or liquid.

11. The machine of claim 1, wherein the container is cylindrical.

12. The machine of claim 11, wherein the machine pockets are configured at least partially-cylindrically.

13. The machine of claim 1, wherein the container is spirally-wound.

14. The machine of claim 1, wherein the container is linearly formed around a mandrel.

15. The machine of claim 1, wherein the container is oriented vertically.

16. A window-finishing machine adapted to receive a container having a body, a first end, and a second end opposite the first end, wherein the body comprises at least a body ply and a film liner ply, wherein the body ply has an inner surface and an outer surface and defines at least one aperture therethrough, wherein the liner ply is adhered to the inner surface of the body ply and has a portion extending across said at least one aperture, forming a window of the container, and wherein the machine comprises:

a. at least one first platen;
b. at least one second platen, wherein the at least one first platen is adapted to engage the first end of the container and the at least one second platen is adapted to engage the second end of the container;
c. at least one machine pocket positioned between the at least one first platen and the at least one second platen, wherein the at least one machine pocket has an inside wall adapted to receive the window;
d. a heating element extending through a through hole in the at least one first platen or the at least one second platen, wherein the heating element is positioned to heat the window of the container; and
e. a pressurized air device that is adapted to release pressurized air into the container through the at least one first platen or the at least one second platen.

17. The machine of claim 16, wherein the heating element is removably inserted through the at least one first platen or the at least one second platen.

18. The machine of claim 16, wherein the inside wall of the at least one machine pocket is contoured.

19. The machine of claim 18, wherein the contour of the at least one machine pocket is selected from the group consisting of smooth, textured, imprinted, columned, v-shaped, triangular, and corrugated.

20. The machine of claim 16, additionally comprising forced cold air or liquid for cooling the inside wall of the at least one machine pocket.

* * * * *